United States Patent
Turos

(10) Patent No.: US 7,905,165 B1
(45) Date of Patent: *Mar. 15, 2011

(54) ADAPTER ASSEMBLY FOR HUBBED ROTOR

(75) Inventor: Kenneth Turos, Las Cruces, NM (US)

(73) Assignee: Sun Systems, Inc., Las Cruces, NM (US)

( * ) Notice: Subject to any disclaimer, the term of this patent is extended or adjusted under 35 U.S.C. 154(b) by 780 days.

This patent is subject to a terminal disclaimer.

(21) Appl. No.: 11/376,271

(22) Filed: Mar. 15, 2006

Related U.S. Application Data

(63) Continuation-in-part of application No. 11/365,733, filed on Mar. 1, 2006, now Pat. No. 7,765,667.

(51) Int. Cl.
*B23B 5/02* (2006.01)
*B23B 1/00* (2006.01)
(52) U.S. Cl. .............................. 82/112; 82/151
(58) Field of Classification Search ............... 82/112, 82/1.11, 151, 157, 162, 903
See application file for complete search history.

(56) References Cited

U.S. PATENT DOCUMENTS

| 4,165,662 | A | * | 8/1979 | Besenbruch et al. | ........... 82/112 |
|---|---|---|---|---|---|
| 4,556,130 | A | * | 12/1985 | Puszakowski | ............ 188/218 A |
| 4,678,066 | A | * | 7/1987 | Heintz | ....................... 188/218 A |
| 5,224,303 | A | * | 7/1993 | Baldwin | ........................ 451/365 |
| 5,398,999 | A | * | 3/1995 | Last | ................. 301/6.1 |
| 5,737,985 | A | * | 4/1998 | Rimlinger, Jr. | .................. 82/165 |
| 5,996,454 | A | * | 12/1999 | Brinks, Jr. | ....................... 82/151 |
| 6,279,919 | B1 | | 8/2001 | Turos | |
| 6,397,989 | B2 | | 6/2002 | Turos | |
| 6,554,291 | B2 | | 4/2003 | Turos | |
| 6,631,660 | B2 | | 10/2003 | Turos | |
| 6,792,680 | B2 | * | 9/2004 | Mazur et al. | ............. 29/894.361 |
| 7,624,662 | B1 | * | 12/2009 | Turos | ................. 82/112 |
| 7,677,144 | B2 | * | 3/2010 | Brotherton et al. | ............ 82/1.11 |
| 7,765,667 | B1 | * | 8/2010 | Turos | ......................... 29/402.19 |

OTHER PUBLICATIONS

U.S. Appl. No. 10/684,021, Kenneth Turos/Application.

\* cited by examiner

*Primary Examiner* — Boyer D Ashley
*Assistant Examiner* — Sara Addisu
(74) *Attorney, Agent, or Firm* — Ray R. Regan

(57) ABSTRACT

A adapter assembly for refinishing a hubbed rotor is provided. The adapter assembly for a hubbed rotor includes an adapter drum and a self-centering bearing mechanism sleeve mountable on a brake lathe arbor to secure a hubbed rotor during a refinishing operation.

14 Claims, 6 Drawing Sheets

ADAPTER ASSEMBLY FOR HUBBED ROTOR

CROSS-REFERENCE TO RELATED APPLICATION

This application is a continuation-in-part from an application, application Ser. No. 11/365,733, entitled a REVERSIBLE FLANGE PLATE filed on Mar. 1, 2006 (now U.S. Pat. No. 7,765,667). The specification of the Application is incorporated by reference into this document.

FIELD OF TECHNOLOGY

The apparatus and method for making the apparatus disclosed and claimed in this document pertain generally to securing a brake to a rotatable machine member to perform work on the brake. More particularly, the new and useful adapter assembly for a hubbed rotor disclosed and claimed in this document is mountable on a shaft or arbor of a brake lathe to which a hubbed vehicular brake or a flywheel has been secured for machining, refinishing, balancing and resurfacing operations (collectively, "refinishing"). The adapter assembly for a hubbed rotor is particularly, but not exclusively, useful for use in refinishing a truck rotor such as those installed on Ford® pickup trucks, models F-150®, beginning with the model year 2004. The adapter assembly for a hubbed rotor allows an operator of a brake lathe to refinish a hubbed rotor is machined to exacting specifications.

BACKGROUND

In connection with a motor vehicle, a brake, of course, is any mechanical device for arresting the motion of a wheel (and accordingly the vehicle) by means of friction. Kinetic energy is converted into heat energy through use of frictional forces applied to the wheels of the vehicle, causing the vehicle to slow or stop. A drum brake is a type of brake using a drum-shaped metal cylinder attached to the inner surface of the wheel of a motor vehicle and rotating within it. When the brake is applied, curved brake shoes with friction linings press against the drum's inner circumference to slow or stop the vehicle. The rotating part of a disc brake is also called a "rotor." The nonrotating, basically stationary, component of a disc brake system is a brake caliper that applies force from a hydraulic system to the rotor or disc to decelerate and stop a vehicle.

Brake fade is a condition brought about by repeated or protracted braking that results in reduced braking effectiveness (fading). Heat is the primary cause of brake fade, which in turn causes expansion and other undesirable thermal effects on a brake. Although disc brakes are less prone to fade because rotors are more effectively cooled by air moving across the brakes, and can be internally vented to increase resistance to fade, nevertheless persistent stop-and-start braking causes damage to any brake, whether a drum or rotor. Accordingly, a significant industry has developed in connection with the machining, refinishing, balancing and resurfacing of brake rotors.

To refinish a brake, a drum or a rotor is mounted on a rotatable shaft or arbor of a brake lathe system. During operation, forces due to rotation and gravity tend to preclude uniform rotation of the rotating arbor on which a brake has been mounted. The arbor and devices mounted on the arbor for refinishing do not rotate in a single, unvarying plane of rotation. The forces acting on a rotating arbor and brake may distort in one or more planes and along one or more axes of rotation. The forces exert a variety of angular and planar forces that affect how accurately and quickly the brake lathe operator may work on a brake to refinish it.

In addition, forces and force vectors may induce harmonics and vibrations that may be transmitted to the arbor, brake and other components of the lathe. A nonuniform rotation of a brake during a refinishing operation may cause a cutting or refinishing tool brought into contact with a brake surface to produce an inferior surface.

To overcome such undesirable problems, the inventor named in this document has received a number of U.S. patents for apparatus and methods that resolve in exemplary fashion adverse consequences of such forces, thus improving the refinishing process, including U.S. Pat. No. 6,279,919B1 issued Aug. 28, 2001 for an Apparatus for Securing a Workpiece to a Rotatable Machine Member; U.S. Pat. No. 6,554,291B1 issued Apr. 29, 2003 for an Apparatus for Securing a Workpiece to a Rotatable Machine Member; U.S. Pat. No. 6,397,989B1 issued on Jun. 4, 2002 for an Apparatus for Reducing Harmonics and Vibrations of a Rotatable Base Piece; U.S. Pat. No. 6,631,660B1 issued Oct. 14, 2003, for a Self-Aligning Arbor Nut System. The inventor currently has pending a U.S. patent application for a Multi-angle Cutting Head, application Ser. No. 10/684,021 filed on Oct. 10, 2003, as well as application Ser. No. 11/365,733 for a Reversible Flange Plate filed on Mar. 1, 2006. The patents and application are collectively referred to in this document as the "Prior Patents" for ease of reference.

The apparatus and method described and claimed in application Ser. No. 11/365,733 for a Reversible Flange Plate adds to the art by providing a flange plate that reduces costs associated with refinishing a rotor by providing on one apparatus differently configured surfaces that allow an operator to reverse the orientation of the flange plate to engage a variety of differently configured brakes.

The apparatus disclosed and claimed in the Prior Patents have proven useful in a variety of situations and installations, and uniquely adapted for uses described in the Prior Patents. Additional optimizations shown and claimed in this document provide an adapter assembly for a hubbed rotor that allows a brake lathe operator to refinish a hubbed rotor of the kind described in this document.

A "hubbed rotor" is a rotor assembly that includes a bearing mechanism that can be connected to an axle, whereas a "hubless" rotor has only a hole in its center and is separate from a hub. A "hubbed rotor" includes at least one bearing mechanism mounted in the rotor and connectable to the axle. A hubbed rotor also includes mounting bolts positioned on the hubbed rotor in numbers, sizes and locations that vary. Mounting bolts are provided, of course, to mount a wheel on a rotor. The adapter assembly for hubbed rotor described and claimed in this document accommodates variations in the number, size and location of mounting bolts. Such variations indicate that neither rotor design nor configuration is standard in the vehicle and automotive industry. Each vehicle manufacturer is free to engineer and design rotors unique to its product line. Ford Motor Company, for example, has introduced a hubbed rotor for use on F-150 vehicles unlike any rotor in the industry.

A hubbed rotor is comparatively expensive. However, for less than ten percent of the cost of replacing a worn hubbed rotor with a new hubbed rotor, a hubbed rotor may be refinished. Currently, however, a hubbed rotor may be refinished only in theory: current tools available for installation on a brake lathe for refinishing rotors cannot accommodate the unique design of some hubbed rotors such as Ford F-150 hubbed rotor. The adapter assembly for a hubbed rotor disclosed and claimed in this document solves the problems associated with refinishing a hubbed rotor.

The problems warranted solving. The Ford F-150 is one of the most popular trucks sold in the United States. For example, in 2004 the Ford F-150 was the top-selling vehicle of any kind in America. According to Automotive News, for the calendar year 2004 Ford Motor Company sold almost 940,000 Ford F-Series units. MSN Autos (http://autos.msn.com) reported that the F-Series has been the best-selling truck in America for 28 straight years. It would appear that Ford F-Series vehicles are and will continue to be a significant factor in the brake refinishing industry for many years. Solving the problems associated with refinishing hubbed rotors will, therefore, save owners considerable money during the operational lives of trucks equipped with a hubbed rotor like that of the F-150. Instead of discarding and replacing expensive hubbed rotors, vehicle owners will have the option to have hubbed rotors refinished for a fraction of the price using the adapter assembly for a hubbed rotor disclosed and claimed in this document.

The adapter assembly for a hubbed rotor is not only easy to assemble on a brake lathe, it is easy to operate. The adapter assembly for a hubbed rotor allows the operator of a brake lathe to produce an accurately and precisely machined, turned and refinished brake. In combination with selected apparatus and methods shown in the Prior Patents, undesirable forces that affect refinishing of a brake may be reduced or eliminated. The adapter assembly for a hubbed rotor also is respectively easy to use and to practice for its intended purposes.

SUMMARY

The term "rotor" as used in this document includes for ease of reference both a brake disc and a brake drum. The term "hubbed rotor" as used in this document, as indicated above, refers in general to a rotor that includes a bearing mechanism that can be connected to an axle, distinguishing such a rotor from a "hubless" rotor having only a hole in its center separate from a hub. A hubbed rotor thus includes at least one bearing mechanism mounted in the rotor and connectable to the axle. A hubbed rotor generally includes mounting bolts positioned on the hubbed rotor in numbers, sizes and locations that vary. The adapter assembly for hubbed rotor described and claimed in this document accommodates the variations in the number, size and location of mounting bolts. In addition, a side of a flywheel facing a pressure plate also can be refinished using the adapter assembly for a hubbed rotor described and claimed in this document.

The adapter assembly for a hubbed rotor includes an adapter drum and a self-centering bearing sleeve. The drum includes a first chamber adapted to contain mounting bolts of the hubbed rotor. In addition, a column is mounted substantially in the center of the first chamber. The column is adapted to removably engage at least one surface of the hubbed rotor. A bore is formed in the column that extends through the column and the drum coincident with the longitudinal axis of the column and the drum. Also, a wall defining a second chamber extends from one end of the column. The second chamber is adapted to compressibly secure the hubbed rotor during a refinishing process. The column further comprises a platform. The platform extends inwardly radially between the wall and the bore toward the bore. The platform is adapted to compressibly engage a ring extension located on the hubbed rotor.

The self-centering bearing sleeve includes a base. The base is formed with a hollow passage through the center of the base that is adapted to slidably engage a break lathe arbor. The self-centering bearing sleeve also includes a cylindrical tube. The cylindrical tube extends at substantially a right angle from one face of the base. The cylindrical tube is adapted to secure the hubbed rotor on a brake lathe arbor. The cylindrical tube is formed with a proximal end and a distal end. The distal end is adapted to slidably engage a bearing mounted on a hubbed rotor.

The adapter assembly for a hubbed rotor, in operation, is used in combination with a brake lath equipped with an arbor.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the adapter assembly for a hubbed rotor will become apparent to those skilled in the art when read in conjunction with the following description, drawing figures, and appended claims.

The foregoing has outlined broadly the more important features of the adapter assembly for a hubbed rotor to better understand the detailed description that follows, and to better understand the contributions to the art. The adapter assembly for a hubbed rotor is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions.

Further, the abstract associated with this disclosure is intended neither to define the adapter assembly for a hubbed rotor, which is measured by the claims, nor intended to limit the scope of the claims.

The novel features of the adapter assembly for a hubbed rotor are best understood from the accompanying drawing, considered in connection with the accompanying description of the drawing, in which similar reference characters refer to similar parts, and in which:

DETAILED DESCRIPTION

To the extent that subscripts to the numerical designations include the lower case letter "n," as in "a-n," the letter "n" is intended to express a number of repetitions of the element designated by that numerical reference and subscripts.

Figure 4A:
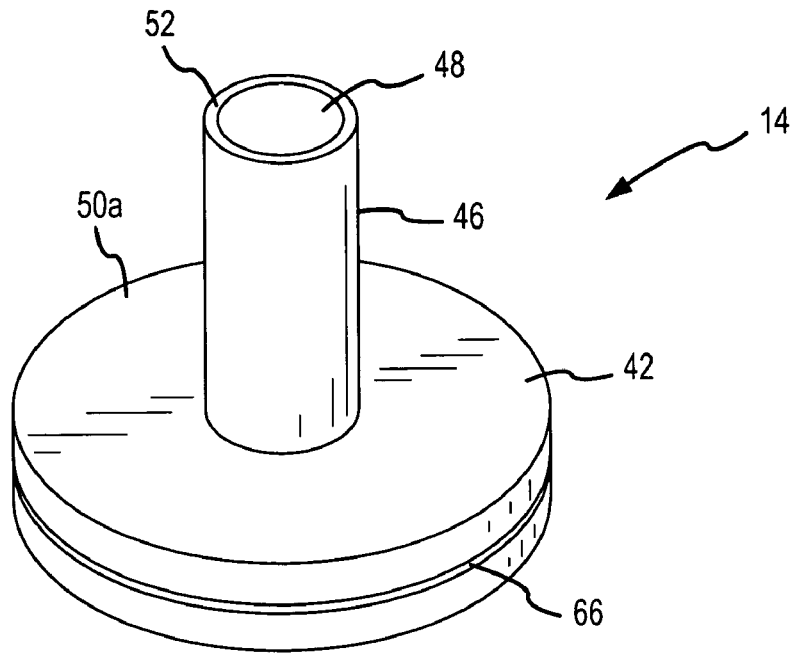
FIG. 4A is a perspective view of the self-centering bearing sleeve of the adapter assembly for a hubbed rotor.
Figure 4B:
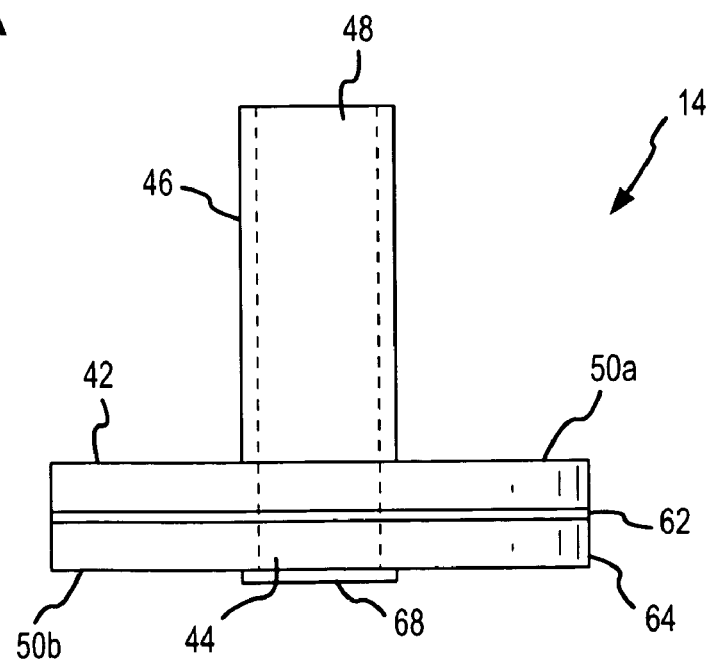
FIG. 4B is a side view of the self-centering bearing sleeve of the adapter assembly for a hubbed rotor.
Figure 5:
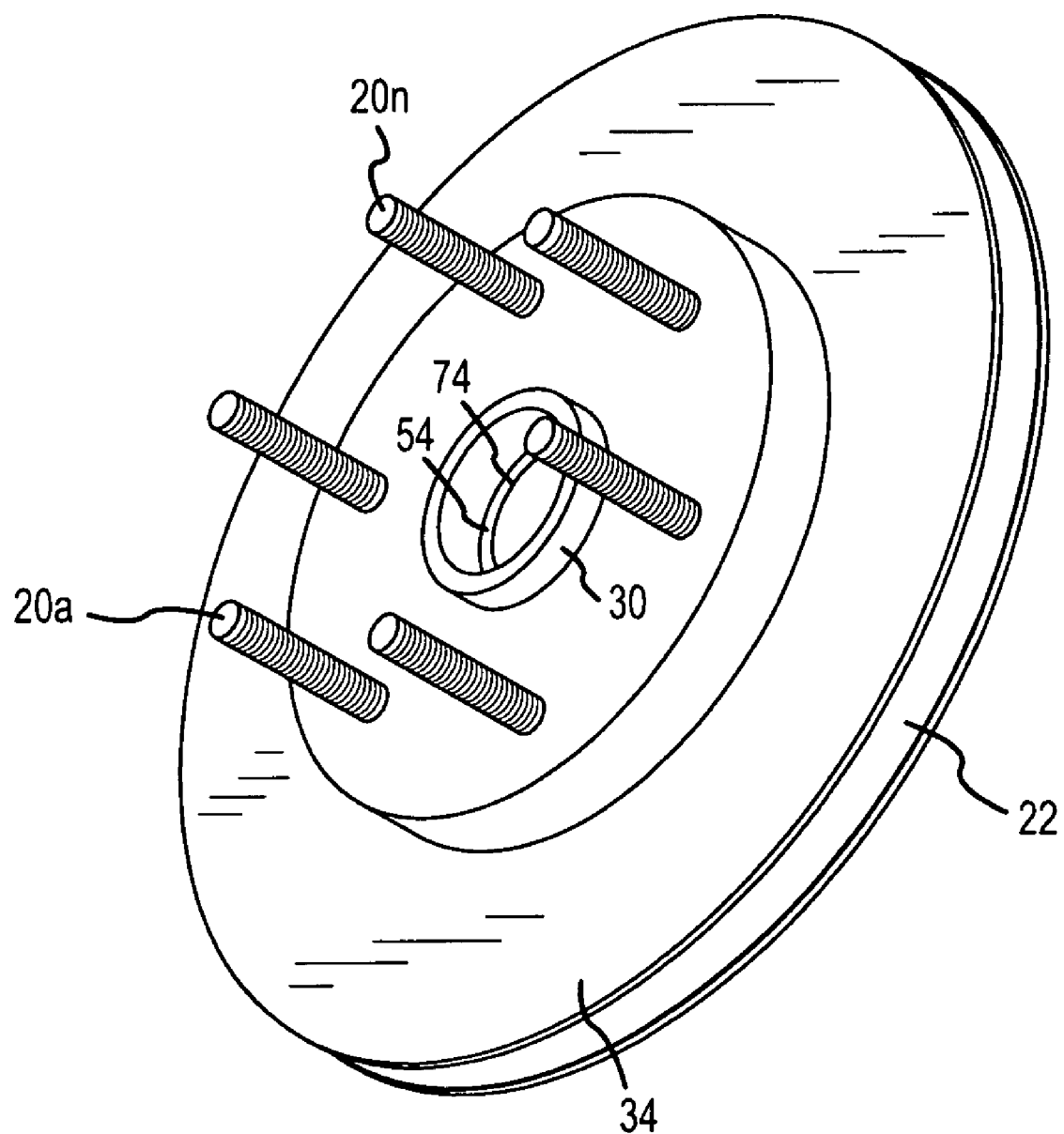
FIG. 5 is a perspective view of a hubbed rotor.

As shown by cross-reference between FIGS. 1-5, an adapter assembly for a hubbed rotor 10 is provided. In its broadest contest, adapter assembly for a hubbed rotor 10 includes adapter drum 12 and a self-centering bearing sleeve 14. As shown best by cross-reference between FIGS. 2-3B, drum 12 includes a substantially circular body 16. Substantially circular body 16 is formed with a first chamber 18. First chamber 18 is adapted to removably house or contain mounting bolts 20 of the hubbed rotor 22. Mounting bolts 20 of hubbed rotor 22 are best shown in FIG. 5.

Substantially circular body 16 includes a bore 24. Bore 24 is formed through the center of substantially circular body 16. Bore 24 is adapted to slidably engage drum 12 on a brake lathe arbor 26 as perhaps best shown by cross-reference between FIGS. 1 and 2.

Substantially circular body 16 also includes a second chamber 28. Second chamber 28 is formed in the substantially circular body 16 adjacent bore 24. Second chamber 28 is adapted for compressibly containing one or more ring extensions 30 of hubbed rotor 22 during rotation of the brake lathe arbor 26 during a refinishing operation.

Figure 3A:
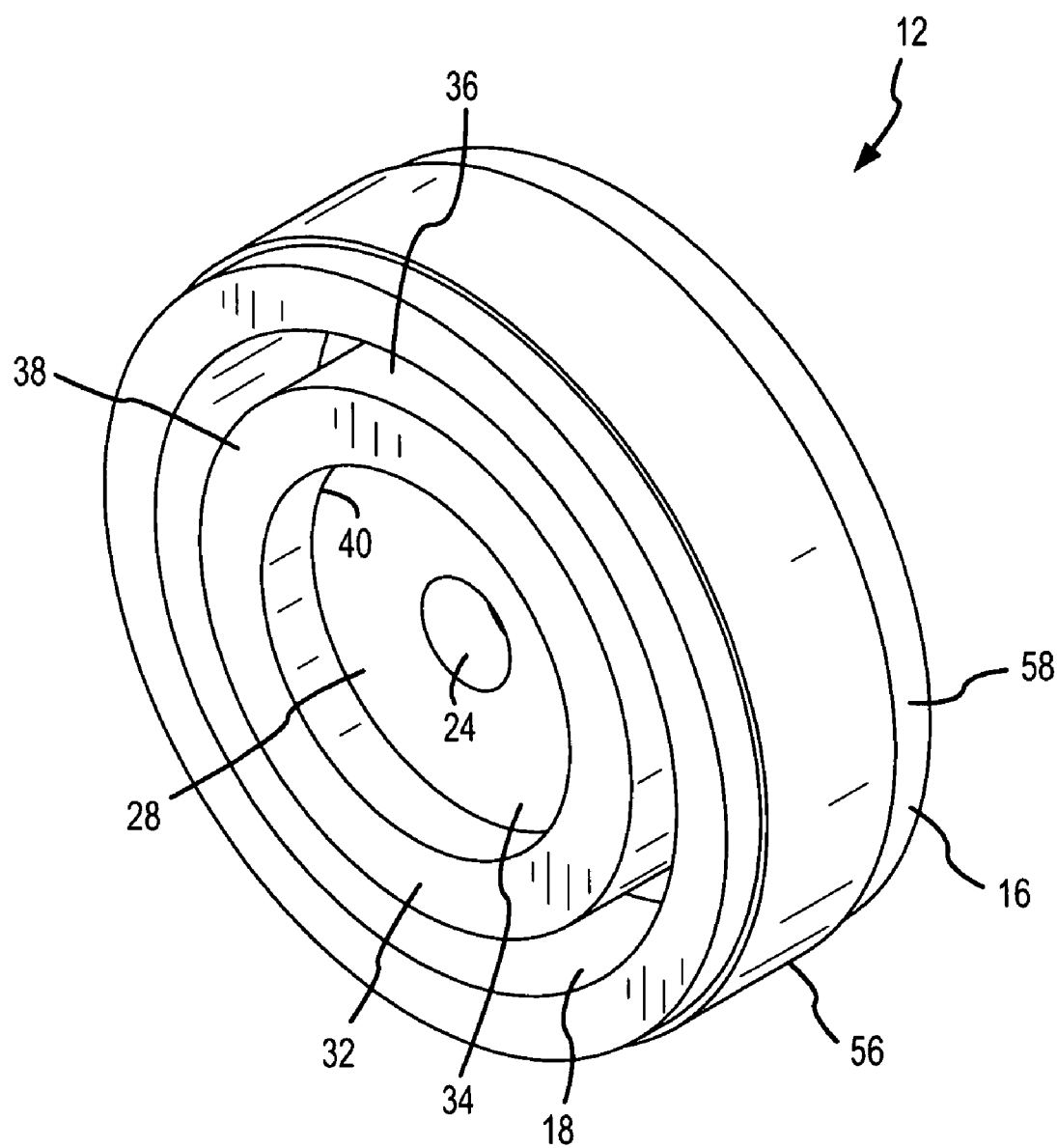
FIG. 3A is a perspective view of the adapter drum of the adapter assembly for a hubbed rotor.
Figure 3B:
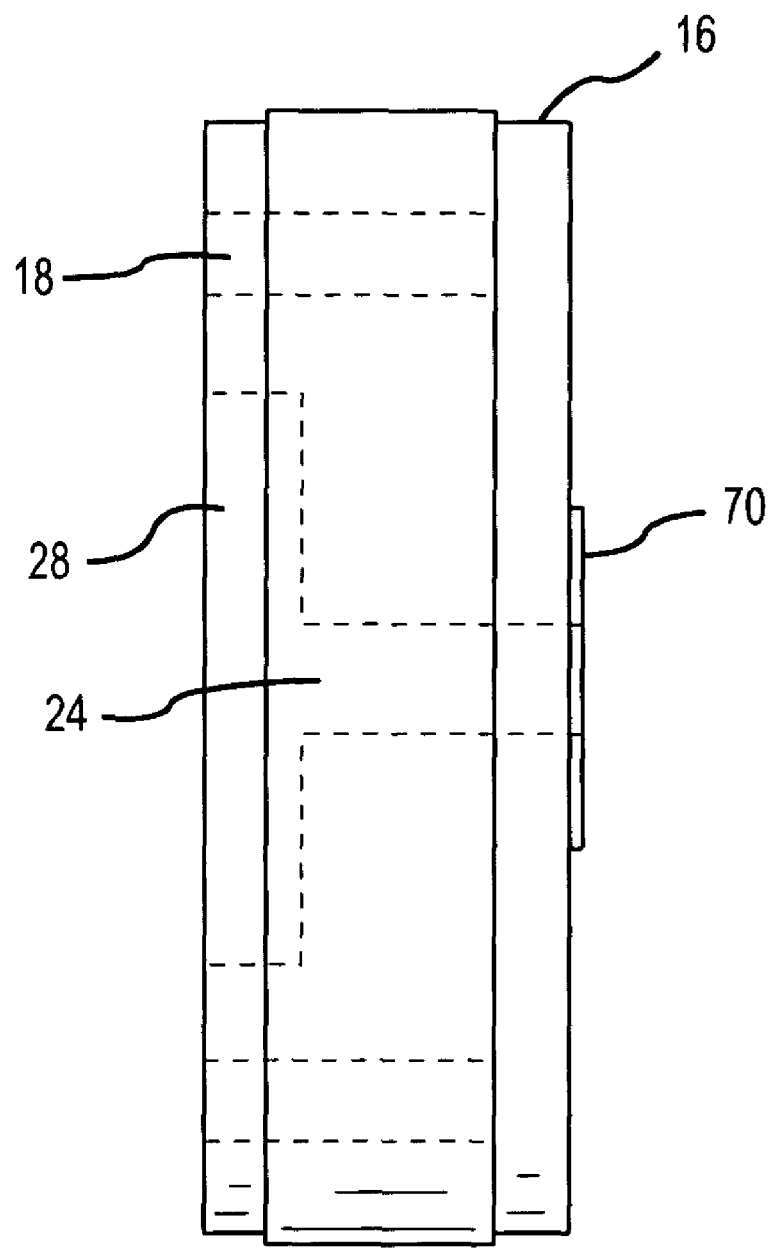
FIG. 3B is a side view of the adapter drum of the adapter assembly for a hubbed rotor.

As shown best in FIG. 3A, drum 12 also includes a column 32. Column 32 is mounted substantially in the center of first chamber 18. Column 32 is adapted to define second chamber 28 by including a lower face 34, a cylindrical extension 36 extending from the lower face 34, and a wall 38 to allow second chamber 28 to contain one or more ring extensions 30 within second chamber 28.

Figure 1:
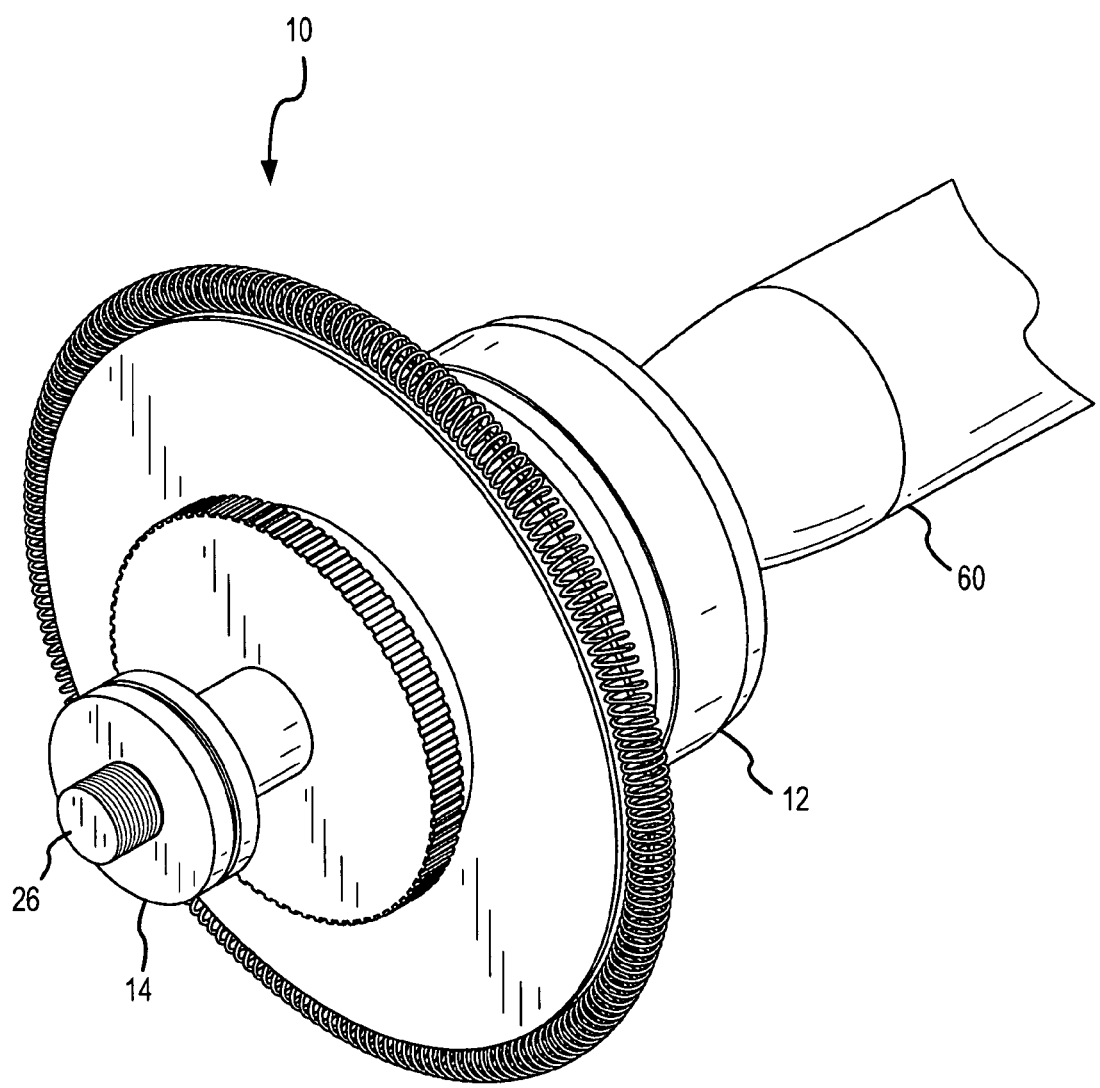
FIG. 1 of the drawing is a perspective view of the adapter assembly for a hubbed rotor in an operative environment mounted on a portion of a brake lathe.
Figure 2:
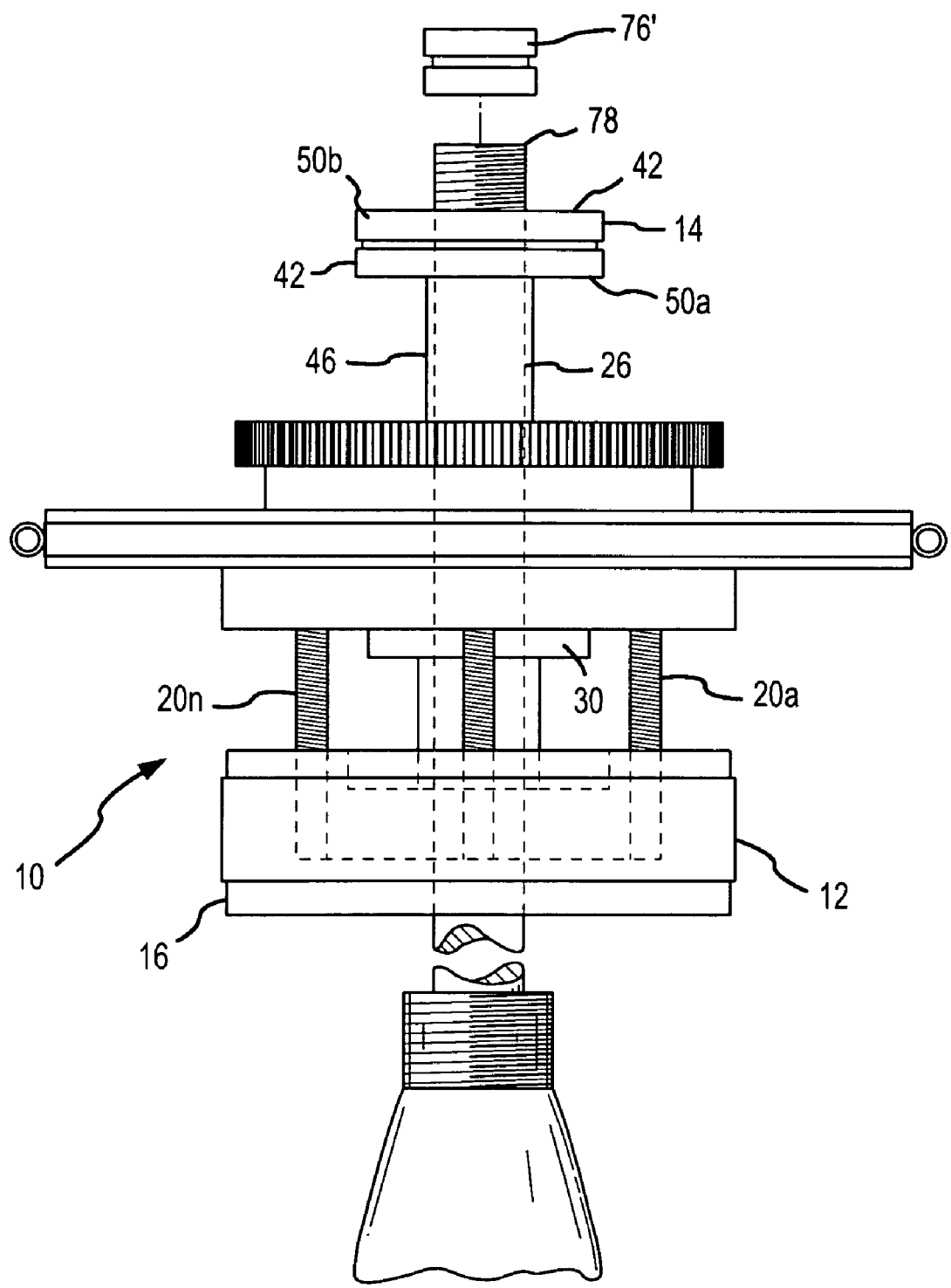
FIG. 2 a top view of the adapter assembly for a hubbed rotor in an operative environment mounted on a portion of a brake lathe.

As indicated, adapter assembly for a hubbed rotor 10, in its broadest context, also includes a self-centering bearing sleeve 14 as perhaps best shown by cross-reference between FIGS. 2, 4A and 4B. As shown, self-centering bearing sleeve 14 includes a base 42. Base 42 is formed with a first hollow passage 44. First hollow passage 44 extends through substantially the center of base 42 for slidable engagement with brake lathe arbor 26.

In addition, self-centering bearing sleeve 14 includes a cylindrical tube 46. As shown perhaps best in FIGS. 4A and 4B, cylindrical tube 46 is formed with a second hollow passage 48. Second hollow passage 48, in combination with first hollow passage 44, is slidably engagable with brake lathe arbor 26. As shown, cylindrical tube 46 monolithically extends at substantially a right angle from one of the opposing faces 50a,b of base 42. The leading end 52 of cylindrical tube 46 is removably engagable with a bearing mechanism 54 mounted in hubbed rotor 22. Bearing mechanism 54 is shown in FIG. 5.

Adapter assembly for a hubbed rotor 10, in one embodiment, includes a resilient sleeve 56 attached to the outer surface 58 of drum 12. Resilient sleeve 56 is provided to facilitate handling of drum 12 by an operator of a brake lathe 60 shown in partial cut-away in FIG. 1. Resilient sleeve 56 also helps to dampen vibrations of drum 12 during a refinishing operation. As shown in FIG. 3A, resilient sleeve 60 is preferably made of rubber. As also shown in FIGS. 4A-4B, a groove 62 is formed in the exterior surface 64 of base 42. Groove 62 is formed to hold a resilient band 66 to facilitate handling the base.

FIG. 4B shows that the base 42 of adapter assembly for a hubbed rotor 10, in one embodiment, may include a first disc 68 formed concave in opposing face 50b of base 42. First disc 68 is included to assist in securing the hubbed rotor 22 on brake lathe arbor 26 during a refinishing operation. Adapter assembly for a hubbed rotor 10 also includes in at least one embodiment a second disc 70 formed concave in a surface 72 of drum 12. Second disc 70 may be formed in surface 72 of drum 12 to assist in securing the hubbed rotor 22 on a brake lathe arbor 26 during a refinishing operation.

Operation

During operation and use of adapter assembly for a hubbed rotor 10, as shown perhaps best in FIG. 2, a brake lathe 60 equipped with a brake lathe arbor 26 is provided. An operator of brake lathe 60 chooses or selects a hubbed rotor 22 for refinishing. Drum 12 is mounted on brake lathe arbor 26 by slidably engaging bore 24 of drum 12 on brake lathe arbor 26. First chamber 18 of drum 12 encircles and contains mounting bolts 20a-n of hubbed rotor 22.

Because of the configuration of hubbed rotor 22, centering cones, springs, and other adapter plates cannot be used or positioned on brake lathe arbor 26 to compressibly hold hubbed rotor 22 during a refinishing operation. Instead, self-centering bearing sleeve 14 is slidably engagable with brake lathe arbor 26 using first hollow passage 44 and second hollow passage 48. Distal leading end 52 of cylindrical tube 46 is pressed against and is removably engagable with bearing mechanism 54 in hubbed rotor 22.

In general, wheel bearings usually include a number of interconnected components. Such components may include an inner race and an outer race. The inner race and the outer race are surfaces within which balls or rollers move. The bearing mechanism thus includes curved surfaces, or races, permitting relative motion between the components with minimum wear and friction. Those components vary depending on the configuration of a hubbed rotor and the design of the bearing mechanism, and accordingly not all components are shown in the accompanying drawing figures. What is shown, however, in FIG. 5 is a surface of the bearing mechanism known as a race 74.

Accordingly, leading end 52 of cylindrical tube 46 bears against and is removably engagably with race 74 of bearing mechanism 54 to contribute to holding the hubbed rotor 22 in a proper position during rotation of brake lathe arbor 26 during a refinishing operation. An arbor nut 76, preferably part of a self-aligning arbor nut system 76', is attached to the end 78 of brake lathe arbor 26 to secure all of the components on the brake lathe arbor 26. Upon energizing the brake lathe 60, a shaping tool (not shown) may be applied to hubbed rotor 22 to refinish hubbed rotor 22.

Adapter assembly for a hubbed rotor 10 shown in drawing FIGS. 1-5 shows at least one embodiment that is not intended to be exclusive, but merely illustrative of the disclosed but non-exclusive embodiments. Also, claim elements and steps in this document have been numbered and lettered solely as an aid in readability and understanding. The numbering is not intended to, and should not be considered as intending to, indicate the ordering of elements and steps in the claims.

What is claimed is:

1. An adapter assembly for a hubbed rotor, comprising:
   a drum formed with a first chamber adapted to contain mounting bolts of the hubbed rotor;
   a column mounted substantially in the center of the first chamber adapted to define a second chamber,
      further comprising a bore extending through the drum and the column coincident with the longitudinal axis of the drum and the column;
   a wall further defining the second chamber extending from one end of the column adapted to secure a portion of the hubbed rotor; and
   a self-centering bearing mechanism sleeve adapted to disengably couple a bearing mechanism located in the hubbed rotor.

2. An adapter assembly for a hubbed rotor as recited in claim 1, wherein the column further comprises a lower face extending radially between the wall and the bore adapted to engage a ring extension on the hubbed rotor.

3. An adapter assembly for a hubbed rotor as recited in claim 1, further comprising a resilient sleeve attached to the drum adapted to facilitate handling of the drum and to help dampen vibrations during use.

4. An adapter assembly for a hubbed rotor as recited in claim 1, wherein the drum and the self-centering bearing mechanism sleeve are made of metal.

5. An adapter assembly for a hubbed rotor as recited in claim 1, wherein the self-centering bearing mechanism sleeve includes a base formed with a first hollow passage through the center of the base adapted to slidably engage a brake lathe arbor.

6. An adapter assembly for a hubbed rotor as recited in claim 1, wherein the self-centering bearing mechanism sleeve includes a cylindrical tube extending at substantially at a right angle from the base adapted to secure the hubbed rotor on a brake lathe arbor.

7. An adapter assembly for a hubbed rotor as recited in claim 6, wherein the cylindrical tube further comprises a second hollow passage adapted to slidably engage a brake lathe arbor.

8. An adapter assembly for a hubbed rotor as recited in claim 7, wherein the base further comprises a groove adapted to hold a resilient band to facilitate handling of the base.

9. An adapter assembly for a hubbed rotor as recited in claim 1, wherein the base further comprises a first disk formed in a face of the base adapted to secure the hubbed rotor on a brake lathe arbor.

10. An adapter assembly for a hubbed rotor as recited in claim 1, wherein the drum further comprises a second disk formed on a surface of the drum to secure the hubbed rotor on a brake lathe arbor.

11. A system for refinishing a hubbed rotor having a bearing mechanism, comprising:
    a base formed with a first hollow passage through substantially the center of the base for slidable engagement with a brake lathe arbor;
    a cylindrical tube having a second hollow passage for slidable engagement with a brake lathe arbor, the cylindrical tube monolithically extending at a right angle from one face of the base,
    wherein the leading end of the cylindrical tube is removably engageable with the bearing mechanism;
    a substantially circular body formed with a first chamber for removably housing mounting bolts of the hubbed rotor,
    wherein the substantially circular body includes a bore through the center of the substantially circular body for slidable engagement on the brake lathe arbor; and
    a second chamber formed in the substantially circular body adjacent the bore for compressibly containing one or more ring extensions of the hubbed rotor during rotation of the brake lathe arbor.

12. A system for refinishing a hubbed rotor having a bearing mechanism as recited in claim 11, wherein the substantially circular body further comprises a resilient sleeve for facilitating handling of the substantially circular body and to dampen vibrations during use.

13. A system for refinishing a hubbed rotor having a bearing mechanism as recited in claim 12, wherein the base further comprises a first disk formed in a face of the base for securing the hubbed rotor on a brake lathe arbor.

14. A system for refinishing a hubbed rotor having a bearing mechanism as recited in claim 13, wherein the substantially circular body further comprises a second disk formed on a surface of the substantially circular body to secure the hubbed rotor on a brake lathe arbor.

* * * * *